United States Patent
Iwao et al.

(10) Patent No.: US 8,420,725 B2
(45) Date of Patent: Apr. 16, 2013

(54) URETHANE RESIN COMPOSITION, COATING MATERIAL, ADHESIVE, CURED PRODUCT OBTAINED USING THE SAME, AND METHOD FOR PRODUCING CURED PRODUCT

(75) Inventors: Takeshi Iwao, Osaka (JP); Naotaka Gotoh, Osaka (JP); Kunihiko Komatsuzaki, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/501,124

(22) PCT Filed: Oct. 26, 2010

(86) PCT No.: PCT/JP2010/068892
§ 371 (c)(1),
(2), (4) Date: Apr. 10, 2012

(87) PCT Pub. No.: WO2011/070865
PCT Pub. Date: Jun. 16, 2011

(65) Prior Publication Data
US 2012/0196967 A1    Aug. 2, 2012

(30) Foreign Application Priority Data

Dec. 10, 2009  (JP) ................................ 2009-280385

(51) Int. Cl.
*C08K 5/05*  (2006.01)

(52) U.S. Cl.
USPC ........... 524/379; 524/430; 524/431; 524/432; 524/433; 524/437

(58) Field of Classification Search .................. 524/379, 524/430–433, 437
See application file for complete search history.

(56) References Cited

U.S. PATENT DOCUMENTS

2011/0009510 A1 *  1/2011  Gotoh et al. .................... 521/88

FOREIGN PATENT DOCUMENTS

| JP | 2010-95726 A | 4/2010 |
| JP | 2010-150383 A | 7/2010 |
| WO | 2009/107404 A1 | 9/2009 |

* cited by examiner

*Primary Examiner* — Edward Cain
(74) *Attorney, Agent, or Firm* — McDermott Will & Emery LLP

(57) ABSTRACT

An object of the present invention is to provide a urethane resin composition that has excellent coating workability and storage stability not causing gelation with time and that can form a cured product such as a coating that has excellent heat resistance. The present invention relates to a urethane resin composition includes an alcohol-soluble urethane resin (A) having a hydrolyzable silyl group, inorganic particles (B), and an alcohol (C), in which the inorganic particles (B) have a functional group [Y] that can react with a functional group [X] generated from the hydrolyzable silyl group of the urethane resin (A), a coating material and an adhesive that contain the urethane resin composition, and a formed body obtained by using the urethane resin composition.

14 Claims, No Drawings

URETHANE RESIN COMPOSITION, COATING MATERIAL, ADHESIVE, CURED PRODUCT OBTAINED USING THE SAME, AND METHOD FOR PRODUCING CURED PRODUCT

CROSS REFERENCE TO PRIOR APPLICATIONS

This application is a U.S. National Phase application under 35 U.S.C. §371 of International Application No. PCT/JP2010/068892, filed on Oct. 26, 2010 and claims benefit of priority to Japanese Patent Application No. 2009-280385, filed on Dec. 10, 2009. The International Application was published in Japanese on Jun. 16, 2011 as WO 2011/070865 A1 under PCT Article 21(2). The contents of the applications are hereby incorporated by reference.

TECHNICAL FIELD

The present invention relates to a urethane resin composition that can be used in various usages such as a coating material, an adhesive, and production of various formed products.

BACKGROUND ART

Solvent-based, water-based, and solventless urethane resin compositions have been known as the urethane resin compositions and used in various usages such as forming materials for films, sheets, etc., adhesives, and coating materials.

Among these, solvent-based urethane resin compositions are capable of forming coatings that generally have excellent durability and water resistance compared to water-based urethane resin compositions and are thus used widely even today.

However, under the recent trends of reducing the impact on the environment, there is a tendency to avoid use of solvent-based urethane resin compositions. In particular, since urethane resin compositions containing strong solvents such as dimethylformamide have strong adverse effects on the environment and human bodies, the industry requests development of resin compositions that will replace the solvent-based urethane resin compositions.

Recently, development of urethane resin compositions that use alcohol solvents having lower impact on the environment than dimethylformamide and the like is increasingly pursued. For example, an alcohol-soluble urethane resin composition that contains an alcohol having 1 to 7 carbon atoms and a polyurethane resin having a hydrolyzable silyl group in a molecular terminus or a side chain prepared by a particular production method is known (e.g., refer to PTL 1).

Meanwhile, as the usage of the urethane resin compositions expands increasingly, the fields of automobile parts, home electric appliances, electronic materials, and the like in some cases require urethane resin compositions that can form coatings with significantly high heat resistance so that the coatings do not undergo deformation or mass loss even in a high-temperature environment of about 200° C. or higher and preferably 260° C. or higher.

However, the incipient fluidization temperature of a cured product obtained by curing a urethane resin composition described in PTL 1 is generally about 150° C. to 200° C. and thus the composition can rarely be used in usages that require the aforementioned high level of heat resistance.

As a method for improving the heat resistance, a method of introducing a large number of functional groups that can form crosslinking points in a urethane resin has been known.

However, coating materials and adhesives are generally required to exhibit excellent storage stability that does not cause gelation or the like even when left at room temperature. The urethane resin composition having a large number of crosslinking points introduced therein rarely has storage stability and coating workability sufficient for practical application.

CITATION LIST

Patent Literature

PTL 1: Japanese Unexamined Patent Application Publication No. 2010-95726

SUMMARY OF INVENTION

Technical Problem

An object of the present invention is to provide a urethane resin composition that has excellent coating workability and storage stability not causing gelation with time and that can form a cured product such as a coating that has excellent heat resistance.

Solution to Problem

The inventors have conducted investigations based on the alcohol-soluble urethane resin composition set forth in PTL 1 and found that a resin composition containing inorganic particles having functional groups that can crosslink with the alcohol-soluble urethane resin can maintain good storage stability, coating workability, and handleability without increasing the viscosity in the presence of an alcohol and that when this resin composition is applied on a substrate surface or the like and the alcohol is evaporated or the like, a cured product such as a coating that has excellent heat resistance can be obtained due to the progress of cross-linking reactions between the urethane resin and the inorganic particles.

In other words, the present invention relates to a urethane resin composition that includes an alcohol-soluble urethane resin (A) having a hydrolyzable silyl group, inorganic particles (B), and an alcohol (C), in which the inorganic particles (B) have a functional group [Y] that can react with a functional group [X] generated from the hydrolyzable silyl group of the urethane resin (A), a coating material and an adhesive containing the urethane resin composition, and a cured product obtained by using the urethane resin composition.

The present invention also relates to a method for producing a cured product, the method including applying a composition obtained by mixing the urethane resin composition and, if needed, water or an acid catalyst onto a substrate surface and removing the alcohol (C) contained in the applied layer so that the functional group [X] formed by hydrolysis of the hydrolyzable silyl group of the alcohol-soluble urethane resin (A) reacts with the functional group [Y] of the inorganic particles (B) to form a bond.

Advantageous Effects of Invention

The urethane resin composition of the present invention does not cause gelation with time even when left at room temperature for a long time, has excellent storage stability and coating workability, and is capable of forming a coating that can maintain excellent heat resistance for a long time. Thus, the urethane resin composition can be used in coating materials such as surface coatings of automobile parts, electronic parts, etc., and in adhesives used for bonding such parts. Moreover, the urethane resin composition of the present invention can be used as forming materials for cured products required to achieve a very high level of heat resistance, such as medical materials, automobile parts, home electric appliances parts, electronic materials, etc.

DESCRIPTION OF EMBODIMENTS

The present invention provides a urethane resin composition that includes an alcohol-soluble urethane resin (A) having a hydrolyzable silyl group, inorganic particles (B), an alcohol (C), and, if needed, other additives, in which the inorganic particles (B) have a functional group [Y] that can react with a functional group [X] generated from the hydrolyzable silyl group of the urethane resin (A).

The urethane resin composition contains the alcohol (C) as a solvent and the alcohol-soluble urethane resin (A), the inorganic particles (B), etc., are dissolved or dispersed in the alcohol (C).

Here, the alcohol-soluble urethane resin (A) and the inorganic particles (B) do not react with each other to form bonds in the solvent alcohol (C) and usually stay independent from each other. This is because the hydrolyzable silyl group of the urethane resin (A) does not undergo hydrolysis in the alcohol (C) and thus-does not form a silanol group corresponding to the functional group [X]. Moreover, even when a urethane resin already having a functional group [X] such as a silanol group is used as the urethane resin (A) and mixed with the alcohol (C), the silanol group reversibly forms a hydrolyzable silyl group, in particular, an alkoxysilyl group, and thus rarely forms a bond with the functional group [Y] of the inorganic particles (B) in the presence of the alcohol (C).

Accordingly, the urethane resin composition of the present invention does not cause an increase in viscosity with time and can maintain excellent storage stability and coating workability for a long time.

According to the urethane resin composition of the present invention, the alcohol-soluble urethane resin (A) and the inorganic particles (B) may be dissolved or dispersed in the alcohol (C) by partially forming bonds with each other as long as the excellent storage stability etc., are not impaired.

The urethane resin composition of the present invention preferably has a viscosity in the range of 500 to 10,000 mmPa·s from the viewpoint of good coating workability and the like.

When the urethane resin composition of the present invention is applied onto surfaces of various substrates and dried to evaporate and remove the alcohol (C) contained in the applied layers, the hydrolyzable silyl group in the alcohol-soluble urethane resin (A) is hydrolyzed by moisture (water) in the air, water intentionally added, or the like and forms a functional group [X] such as a silanol group. A hydrolytic condensation reaction between the functional group [X] such as a silanol group and the functional group [Y] of the inorganic particles (B) rapidly proceeds and bonds are formed thereby. As a result, the urethane resin composition of the present invention can form a cured product such as a coating having a very high level of heat resistance.

The urethane resin composition of the present invention preferably contains 10 to 400 parts by mass of the inorganic particles (B) relative to 100 parts by mass of the alcohol-soluble urethane resin (A). In particular, in order to further improve the heat resistance of the coating and cured product to be obtained, preferably 50 to 400 parts by mass, more preferably 80 to 300 parts by mass, and most preferably 90 to 200 parts by mass of the inorganic particles (B) are used.

The urethane resin composition of the present invention preferably contains 50 to 300 parts by mass and more preferably 50 to 200 parts by mass of the alcohol (C) relative to 100 parts by mass of the alcohol-soluble urethane resin (A) to impart excellent storage stability, coating workability, etc.

First, the alcohol-soluble urethane resin (A) used in the present invention is described.

The alcohol-soluble urethane resin (A) used in the present invention has a hydrolyzable silyl group in the presence of the alcohol (C). In forming a cured product such as a coating by curing, the hydrolyzable silyl group reacts with moisture (water) in the air or the like to form a functional group [X] such as a silanol group. The functional group [X] reacts with the functional group [Y] of the inorganic particles (B) to form a strong chemical bond (covalent bond). As a result, the heat resistance of the cured product to be obtained can be significantly improved.

The hydrolyzable silyl group of the alcohol-soluble urethane resin (A) is a functional group having a hydrolyzable group directly bonded with a silicon atom and examples thereof include functional groups represented by general formula (I) below.

[Chem. 1]

(where $R^1$ represents a monovalent organic group such as an alkyl group, an aryl group, or an aralkyl group; and $R^2$ represents a halogen atom, an alkoxy group, an acyloxy group, a phenoxy group, an aryloxy group, a mercapto group, an amino group, an amide group, an aminoxy group, an iminoxy group, or an alkenyloxy group. X represents an integer of 0 to 2.)

Examples of the alkyl group include a methyl group, an ethyl group, a propyl group, an isopropyl group, a butyl group, an isobutyl group, a pentyl group, a neopentyl group, a 1-methylbutyl group, a 2-methylbutyl group, a hexyl group and an isohexyl group.

Examples of the aryl group include a phenyl group, a naphthyl group, and a 2-methylphenyl group. Examples of the aralkyl group include a benzyl group, a diphenylmethyl group, and a naphthylmethyl group.

Examples of the halogen atom include a fluorine atom, a chlorine atom, a bromine atom, and an iodine atom.

Examples of the alkoxy group include a methoxy group, an ethoxy group, a propoxy group, an isopropoxy group, and a butoxy group.

Examples of the acyloxy group include acetoxy, propanoyloxy, butanoyloxy, phenylacetoxy, and acetoacetoxy; examples of the aryloxy group include phenyloxy and naphthyloxy; and examples of the alkenyloxy group include an allyloxy group, a 1-propenyloxyl group, and an isopropenyloxy group.

$R^2$s preferably each independently represent an alkoxy group since leaving components such as those represented by general formula $R^2OH$ generated by hydrolysis can be easily removed.

Usually, the alcohol-soluble urethane resin (A) is rarely hydrolyzed in the presence of the alcohol (C), does not form a functional group [X] such as a silanol group, and has a hydrolyzable silyl group such as an alkoxysilyl group; however, a very small fraction thereof may be present in the urethane resin (A) by taking the form of a silanol group.

In order to improve the heat resistance of the cured product to be obtained, preferably 0.5% to 60% by mass, more preferably 0.5% to 30% by mass, and most preferably 1% to 20% by mass of the hydrolyzable silyl group is contained relative to the mass of the alcohol-soluble urethane resin (A).

An alcohol-soluble urethane resin preferably having a number-average molecular weight in the range of 1,000 to 300,000, more preferably 1,500 to 100,000, and most preferably 1,500 to 50,000 is used as the alcohol-soluble urethane resin (A) from the viewpoint of improving the solubility in the alcohol (C) described below. In particular, an alcohol-soluble urethane resin having a number-average molecular weight in the range of 10,000 to 50,000 is preferably used since good solubility in the alcohol (C), excellent heat resistance, and flexibility (elongation) can all be achieved. The alcohol-soluble urethane resin (A) having a number-average molecular weight exceeding about 10,000 is preferably synthesized by (Method 1) described below from the viewpoint of improving the synthetic efficiency or the like.

In the case where a polyisocyanate having an aromatic ring structure is used as a polyisocyanate (a1) described below used in synthesis of the alcohol-soluble urethane resin (A) or where (Method 2) or (Method 4) described below is used in synthesizing the urethane resin (A), an alcohol-soluble urethane resin having a relatively low molecular weight, e.g., in the range of about 1,000 to 30,000 and preferably in the range of 1,000 to 10,000, is preferably used to maintain good solubility in the alcohol (C).

The alcohol-soluble urethane resin (A) can be synthesized, for example, by reacting a urethane prepolymer (a3) having an isocyanate group or a hydroxyl group in a molecule obtained by reacting a polyisocyanate (a1) and a polyol (a2) containing at least one selected from the group consisting of a polyether polyol, a polyester polyol, and a polycarbonate polyol, with a coupling agent (a4) containing at least one selected from the group consisting of an amino group-containing silane coupling agent and an isocyanate group-containing silane coupling agent, and, if needed, a chain elongation agent (a5).

In particular, the alcohol-soluble urethane resin (A) can be synthesized, for example, through a step (first step) of synthesizing a urethane prepolymer (a3) having an isocyanate group or a hydroxyl group in a molecule and a step (second step) of reacting the urethane prepolymer (a3) with the coupling agent (a4) and the chain elongation agent (a5) or only with the coupling agent (a4) to form an alcohol-soluble urethane resin (A) that can be dissolved in the alcohol (C).

First, the first step is described.

The first step is a step of synthesizing a urethane prepolymer (a3) having an isocyanate group or a hydroxyl group in a molecule by reacting the polyisocyanate (a1) and the polyol (a2) containing at least one selected from the group consisting of a polyester polyol, a polyether polyol, and a polycarbonate polyol in the absence of a solvent.

It is important that the reaction between the polyisocyanate (a1) and the polyol (a2) be conducted in the absence of a solvent. For example, when the reaction is conducted in the presence of a strong solvent such as dimethylformamide (DMF), the strong solvent frequently remains in the urethane resin composition and the remaining strong solvent may cause dissolution or discoloration of the surfaces of various substrates. In addition, when the alcohol (C) described below is used as the solvent, the reaction between the polyisocyanate (a1) and the alcohol (C) is induced and the desired alcohol-soluble urethane resin (A) may not be obtained.

Accordingly, the reaction between the polyisocyanate (a1) and the polyol (a2) is preferably conducted in the absence of a solvent as described above or, in the presence of a solvent but with a mild solvent or by thoroughly removing the remaining solvent.

The reaction between the polyisocyanate (a1) and the polyol (a2) is preferably conducted so that the equivalent ratio of the isocyanate groups of the polyisocyanate (a1) and the hydroxyl groups of the polyol (a2), i.e., [isocyanate groups of the polyisocyanate (a1)/hydroxyl groups of the polyol (a2)], is in the range of 0.8 to 10.0, more preferably in the range of 1.0 to 5.0, and most preferably in the range of 1.1 to 2.0. In particular, in order to obtain a urethane resin composition having a higher heat resistance by synthesizing a urethane resin (A) having a relatively high molecular weight, the reaction is preferably conducted at a mass ratio exceeding 1.0. In contrast, in order to synthesize a urethane resin (A) having a relatively low molecular weight to increase the solubility in the alcohol (C), the reaction is preferably conducted at a mass ratio less than 1.0.

The reaction between the polyisocyanate (a1) and the polyol (a2) in the absence of a solvent may be conducted by mixing the polyisocyanate (a1) and the polyol (a2) in batch or sequentially by adding one to the other dropwise at a reaction temperature of 50° C. to 120° C. and more preferably 80° C. to 100° C. and allow the reaction to proceed for about 1 to 15 hours while paying sufficient care against rapid heat generation and bubbling and considering the safety.

Next, the second step is described.

The second step follows the first step of synthesizing the urethane prepolymer (a3) and is a step including one of (Method 1) to (Method 4) described below. This step is a step of preparing an alcohol (C) solution of the alcohol-soluble urethane resin (A) having a hydrolyzable silyl group by reacting the urethane prepolymer (a3), the coupling agent (a4), and, if needed, the chain elongation agent (a5).

First, the (Method 1) is described.

The (Method 1) is a method for preparing an alcohol (C) solution of the alcohol-soluble urethane resin (A) having a hydrolyzable silyl group by mixing and reacting the urethane prepolymer (a3) with a mixture containing the coupling agent (a4), the alcohol (C), and, if needed, the chain elongation agent (a5).

Specifically, a preliminarily prepared mixture containing the coupling agent (a4), the alcohol (C), and, if needed, the chain elongation agent (a5) is mixed with the urethane prepolymer (a3) obtained in the first step to cause the isocyanate group or hydroxyl group of the urethane prepolymer (a3) to react with the functional group, such as an amino group or isocyanate group, of the coupling agent (a4) and the chain elongation agent (a5). As a result, an alcohol (C) solution of the urethane resin (A) having a hydrolyzable silyl group introduced into a molecule can be prepared.

When a monoamine silane coupling agent, a monoisocyanate group-containing silane coupling agent, or the like described below is used as the coupling agent (a4), the hydrolyzable silyl group is introduced into a molecular terminus of the resulting alcohol-soluble urethane resin (A). When a diamine silane coupling agent, a diisocyanate group-containing silane coupling agent, or the like described below is used as the coupling agent (a4), the hydrolyzable silyl group is introduced into a molecular side chain of the resulting alcohol-soluble urethane resin (A).

The mixture containing the coupling agent (a4), the alcohol (C), and, if needed, the chain elongation agent (a5) can be obtained by supplying the coupling agent (a4), the alcohol (C), and, if needed, the chain elongation agent (a5) in batch or sequentially, followed by mixing and stirring at room temperature, in particular, about 10° C. to 50° C. Since the coupling agent (a4) is used in the presence of the alcohol (C), hydrolytic condensation reactions between the hydrolyzable silyl groups of the coupling agent (a4) are substantially inhibited.

According to the Method 1, the monoamine silane coupling agent and an alicyclic structure-containing diamine or aliphatic diamine are preferably used in combination as the coupling agent (a4) and the chain elongation agent (a5), respectively, so that the resulting urethane resin (A) has good solubility in the alcohol (C) and the cured product obtained therefrom exhibits excellent heat resistance.

Next, the (Method 2) is described.

The (Method 2) is a method for preparing an alcohol (C) solution of the alcohol-soluble urethane resin (A) having a hydrolyzable silyl group by mixing and reacting a mixture of the coupling agent (a4) and, if needed, the chain elongation agent (a5) with the urethane prepolymer (a3) to synthesize an alcohol-soluble urethane resin having a hydrolyzable silyl group and/or a silanol group in a molecule; and then mixing the alcohol-soluble urethane resin with the alcohol (C).

Specifically, a preliminarily prepared coupling agent (a4) alone or mixture containing the coupling agent (a4) and the chain elongation agent (a5) is mixed with the urethane prepolymer (a3) obtained in the first step to cause the isocyanate group or hydroxyl group of the urethane prepolymer (a3) to react with the functional group, such as an amino group or isocyanate group, of the coupling agent (a4) and the chain elongation agent (a5). As a result, an alcohol-soluble urethane resin having a hydrolyzable silyl group and/or a silanol group introduced into a molecule is synthesized.

Next, the obtained alcohol-soluble urethane resin and the alcohol (C) are mixed and stirred to obtain an alcohol (C) solution of the alcohol-soluble urethane resin (A). During this process, most of the silanol groups in the urethane resin (A) form hydrolyzable silyl groups in the presence of the alcohol (C).

When the coupling agent (a4) is used in combination with the chain elongation agent (a5), it is preferable to mix the coupling agent (a4) and the chain elongation agent (a5) at room temperature, in particular, under a condition of about 10° C. to 50° C.

Mixing of the urethane prepolymer (a3) with the coupling agent (a4) alone or with the mixture containing the coupling agent (a4) and the chain elongation agent (a5) can be conducted under a temperature condition of preferably 10° C. to 50° C. and more preferably 10° C. to 30° C.

Mixing of the urethane prepolymer (a3) with the mixture of the coupling agent (a4) and the chain elongation agent (a5) may be conducted in batch or by sequential feeding such as adding one to the other dropwise.

According to the Method 2, a monoamine silane coupling agent and an alicyclic structure-containing diamine or aliphatic diamine are preferably used in combination as the coupling agent (a4) and the chain elongation agent (a5), respectively. According to such a Method 2, when a polyisocyanate having an aromatic ring structure is used as the polyisocyanate (a1) and a polyester polyol, a polycarbonate polyol, or the like is used as the polyol (a2), an alcohol-soluble urethane resin that can form a cured product having higher durability such as heat resistance and chemical resistance can be synthesized efficiently.

When an alcohol-soluble urethane resin having an aromatic ring structure is synthesized by the (Method 2), the method is preferably adjusted so that a urethane resin having a relatively low molecular weight, i.e., a number-average molecular weight of about 1,000 to 10,000 and preferably about 1,000 to 5,000, can be obtained from the viewpoint of maintaining good solubility in the alcohol.

Mixing of the alcohol-soluble urethane resin (A) obtained by the aforementioned method and the alcohol (C) is preferably conducted under a temperature condition of 10° C. to 50° C. Mixing of the alcohol-soluble urethane resin (A) with the alcohol (B) can be conducted in batch or by sequential feeding such as adding one to the other dropwise.

Next, the (Method 3) is described.

The (Method 3) is a method for preparing an alcohol (C) solution of the alcohol-soluble urethane resin (A) having a hydrolyzable silyl group by mixing and reacting the coupling agent (a4) and the chain elongation agent (a5) with a mixture of the urethane prepolymer (a3) obtained in the first step and the alcohol (C).

Specifically, a mixture of the urethane prepolymer (a3) obtained in the first step dissolved in the alcohol (C) is preliminarily prepared and the mixture is mixed with the coupling agent (a4) and the chain elongation agent (a5) to cause the functional group, such as an amino group or isocyanate group, of the coupling agent (a4) and the chain elongation agent (a5) to react with the isocyanate group or hydroxyl group of the urethane prepolymer (a3). As a result, the alcohol (C) solution of the alcohol-soluble urethane resin (A) can be obtained.

It is important to conduct mixing of the urethane prepolymer (a3) and the alcohol (C) at room temperature or under a relatively low temperature condition of preferably 10° C. to 50° C. and more preferably 10° C. to 30° C. to prevent the reaction between the isocyanate group of the urethane prepolymer (a3) and the hydroxyl group of the alcohol (C).

Mixing of the urethane prepolymer (a3) with the alcohol (C) may be conducted in batch or by sequential feeding such as adding one to the other dropwise.

Mixing of the mixture of the urethane prepolymer (a3) and the alcohol (C) with the coupling agent (a4) and the chain elongation agent (a5) may be conducted in batch or by sequential feeding such as adding one component to another component dropwise. However, in order to prevent the reaction between the isocyanate group of the urethane prepolymer (a3) and the hydroxyl group of the alcohol (C), the mixture of the urethane prepolymer (a3) and the alcohol (C) is preferably mixed with the coupling agent (a4) and the chain elongation agent (a5) as soon as possible after preparation of the mixture, i.e., within about 2 hours after completion of preparation of the mixture, under a condition of 10° C. to 50° C., and then the reaction is preferably conducted at about 10° C. to 50° C.

According to the Method 3, the monoamine silane coupling agent and an alicyclic structure-containing diamine or aliphatic diamine are preferably used in combination as the coupling agent (a4) and the chain elongation agent (a5), respectively, so that the resulting urethane resin (A) has good solubility in the alcohol (C) and the cured product obtained therefrom exhibits excellent heat resistance.

Next, the (Method 4) is described.

The (Method 4) is a method for preparing an alcohol (C) solution of the alcohol-soluble urethane resin (A) having a hydrolyzable silyl group and/or a silanol group by mixing and reacting the coupling agent (a4) and the urethane prepolymer (a3) to synthesize an alcohol-soluble urethane resin (A) having a hydrolyzable silyl group and/or a silanol group, and then mixing the alcohol-soluble urethane resin (A) and an alcohol (B).

In particular, the coupling agent (a4) and the urethane prepolymer (a3) obtained in the first step are mixed so that the functional group such as an isocyanate group or an amino group of the coupling agent (a4) reacts with an isocyanate group or a hydroxyl group of the urethane prepolymer (a3) to thereby synthesize the alcohol-soluble urethane resin (A). Next, the alcohol-soluble urethane resin (A) and the alcohol (C) are mixed and stirred to obtain the alcohol solution (B) of the alcohol-soluble urethane resin (A). During this process, most of the silanol groups in the urethane resin (A) form hydrolyzable silyl groups in the presence of the alcohol (C).

Mixing of the coupling agent (a4) and the urethane prepolymer (a3) may be conducted in batch or by sequential feeding such as adding one to the other dropwise under a condition of preferably 10° C. to 50° C. and more preferably 10° C. to 30° C.

Mixing of the alcohol-soluble urethane resin (A) with the alcohol (B) may be conducted in batch or by sequential feeding such as adding one to the other dropwise under a condition of, for example, 10° C. to 50° C.

According to the Method 4, a monoamine silane coupling agent is preferably used as the coupling agent (a4). According to such a Method 4, an alcohol-soluble urethane resin that can form a cured product having high durability such as heat resistance and chemical resistance can be efficiently produced even when the polyisocyanate (a1) and the polyol (a2) has an aromatic ring structure and the polyester polyol or the polycarbonate polyol is used as the polyol (a2).

When an alcohol-soluble urethane resin is synthesized by the Method 4, the method is preferably adjusted so that a urethane resin having a relatively low molecular weight, i.e., a number-average molecular weight of about 1,000 to 10,000 and preferably about 1,000 to 5,000, can be obtained from the viewpoint of maintaining good solubility in the alcohol.

The alcohol-soluble urethane resin (A) obtained by the first and second steps has high solubility in the alcohol (C) described below. The solubility of the urethane resin (A) means that preferably 95% by mass or more, more preferably 99% by mass or more, and most preferably substantially 100% of the urethane resin (A) can be dissolved in the alcohol (C). The solubility of the urethane resin (A) refers to a state in which no clouding occurs and a transparent state can be maintained when the urethane resin composition of the present invention is visually observed.

Examples of the polyisocyanate (a1) that can be used in synthesizing the alcohol-soluble urethane resin (A) include aromatic ring structure-containing polyisocyanates such as 4,4'-diphenylmethane diisocyanate, 2,4'-diphenylmethane diisocyanate, polymethylene polyphenyl polyisocyanate, carbodiimidized diphenylmethane polyisocyanate, 2,4-tolylene diisocyanate, 2,6-tolylene diisocyanate, xylylene diisocyanate, 1,5-naphthalene diisocyanate, and tetramethylxylene diisocyanate; alicyclic structure-containing polyisocyanates such as isophorone diisocyanate, hydrogenated diphenylmethane diisocyanate, and hydrogenated xylylene diisocyanate; and aliphatic polyisocyanates such as hexamethylene diisocyanate, dimer acid diisocyanate, and norbornene diisocyanate.

Among these, an alicyclic structure-containing polyisocyanate or an aliphatic polyisocyanate is preferably used from the viewpoint of synthesizing an alcohol-soluble urethane resin (A) that has high solubility in the alcohol (C) described below but does not undergo side-reaction with the alcohol (C). Use of isophorone diisocyanate is particularly preferable. Note that when an aromatic ring structure-containing polyisocyanate alone is used as the polyisocyanate (a1), the Method 2 or 4 is preferably conducted as the second step in synthesizing the urethane resin (A).

A polyol that contains at least one selected from the group consisting of a polyether polyol, a polyester polyol, and a polycarbonate polyol can be used as the polyol (a2) that can react with the polyisocyanate (a1).

In synthesizing a urethane resin composition that contains an alcohol-soluble urethane resin (A) having a relatively high molecular weight, i.e., about 10,000 to 300,000, a polyether polyol is preferably used as the polyol (a2). According to this urethane resin composition, both high solubility in an alcohol and higher heat resistance of the obtained cured product can be achieved.

In contrast, in order to simultaneously achieve the improved durability, such as heat resistance, and chemical resistance, of the cured product to be obtained, high hardness, and high solubility in an alcohol, a combination of a polycarbonate polyol or a polyester polyol with the polyether polyol is preferably used as the polyol (a2). When the polycarbonate polyol or the polyester polyol is used alone, or when an aromatic ring structure-containing polyester polyol is used as the polyester polyol, the molecular weight of the alcohol-soluble urethane resin (A) is preferably adjusted to a relatively low level, i.e., about 1,000 to 10,000 and preferably about 1,000 to 5,000. Moreover, the Method 2 or 4 is preferably employed as the second step in synthesizing the urethane resin (A).

A polyol having a number-average molecular weight in the range of 800 to 5,000 and more preferably 800 to 3,000 is preferably used as the polyol (a2) from the viewpoint of enhancing the solubility of the obtained alcohol-soluble urethane resin (A) in an alcohol.

For example, a polyether polyol prepared by addition polymerization of an alkylene oxide with at least one compound having two or more active hydrogen atoms as an initiator can be used as the polyether polyol described above.

Examples of the initiator include ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, and trimethylolpropane.

Examples of the alkylene oxide include ethylene oxide, propylene oxide, butylene oxide, styrene oxide, epichlorohydrin, and tetrahydrofuran.

Polyethylene glycol, polypropylene glycol, or polytetramethylene glycol is particularly preferably used as the polyether polyol to maintain high solubility of the obtained urethane resin (A) in the alcohol (C).

Examples of the polyester polyol include an aliphatic or aromatic polyester polyol obtained by esterification of a low-molecular-weight polyol and polycarboxylic acid, a polyester obtained by ring-opening polymerization of a cyclic ester compound such as ε-caprolactone or γ-butyrolactone, and a copolymerized polyester thereof. An aromatic ring structure-containing polyester polyol is preferably used as the polyester polyol from the viewpoints of improving the durability, such as heat resistance and chemical resistance, of the cured product to be obtained, high hardness, and high solubility in an alcohol. When the aromatic ring structure-containing polyester polyol is used, the Method 2 or 4 is preferably employed as the second step in synthesizing the alcohol-soluble urethane resin (A).

Examples of the polyol having a low molecular weight include ethylene glycol, 1,2-propanediol, 1,3-butanediol, 1,4-butanediol, 3-methyl-1,5-pentanediol, 1,6-hexanediol, 1,4-cyclohexanedimethanol, neopentyl glycol, diethylene glycol, dipropylene glycol, glycerin, and trimethylolpropane. These may be used alone or in combination.

Examples of the polycarboxylic acid include succinic acid, adipic acid, sebacic acid, dodecane dicarboxylic acid, azelaic acid, cyclopentanedicarboxylic acid, cyclohexanedicarboxylic acid, terephthalic acid, isophthalic acid, phthalic acid, and naphthalenedicarboxylic acid, anhydrides of these, and ester-forming derivatives of these. When an aromatic ring structure-containing polyester polyol is used, an aromatic polycarboxylic acid such as terephthalic acid, isophthalic acid, phthalic acid, or naphthalenedicarboxylic acid is preferably used as the polycarboxylic acid.

Examples of the polycarbonate polyol include those obtained by the reaction of a carbonate and a polyol and those obtained by the reaction of a phosgene and bisphenol A or the like.

Examples of the carbonate include methyl carbonate, dimethyl carbonate, ethyl carbonate, diethyl carbonate, cyclocarbonate, and diphenyl carbonate.

Examples of the polyol that can react with the carbonate include dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 3-methyl-1,5-pentanediol, 2-ethyl-1,3-hexanediol, 2-methyl-1,3-propanediol, 2-methyl-1,8-octanediol, 2-butyl-2-ethyl propanediol, 2-methyl-1,8-octanediol, neopentyl glycol, 1,4-cyclohexanediol, 1,4-cyclohexanedimethanol, hydroquinone, resorcin, bisphenol-A, bisphenol-F, and 4,4'-biphenol; polyether polyols such as polyethylene glycol, polypropylene glycol, and polytetramethylene glycol; and polyester polyols such as polyhexamethylene adipate, polyhexamethylene succinate, and polycaprolactone.

The polyether polyol, polyester polyol, or polycarbonate polyol described above may be used as the polyol (a2). If needed, another polyol may be used in combination.

Examples of this other polyol include hydrophilic group-containing polyols such as ethylene glycol, 1,2-propanediol, 1,3-butanediol, 1,4-butanediol, 3-methyl-1,5-pentanediol, 1,6-hexanediol, 1,4-cyclohexanedimethanol, neopentyl glycol, diethylene glycol, dipropylene glycol, glycerin, trimethylolpropane, and dimethylolpropionic acid, acryl polyols in which a hydroxyl group is introduced into an acryl copolymer, a polybutadiene polyol which is a copolymer of butadiene containing a hydroxyl group in a molecule, a hydrogenated polybutadiene polyol, and a partially saponified ethylene-vinyl acetate copolymer. A polyether ester polyol may also be used as the other polyol.

The coupling agent (a4) used in synthesizing the alcohol-soluble urethane resin (A) is used to introduce a hydrolyzable silyl group into a molecular terminus or a molecular side chain of the urethane resin (A).

For example, an amino group-containing silane coupling agent or an isocyanate group-containing silane coupling agent can be used as the coupling agent (a4).

Examples of the amino group-containing silane coupling agent include a monoamine silane coupling agent and a diamine silane coupling agent. When the molecular terminus of the urethane prepolymer (a3) is an isocyanate group and the monoamine silane coupling agent is used, the amino group of the monoamine silane coupling agent reacts with the isocyanate group. As a result, an alcohol-soluble urethane resin (A) having a hydrolyzable silyl group at a molecular terminus can be obtained.

In contrast, when the molecular terminus of the urethane prepolymer (a3) is an isocyanate group and the diamine silane coupling agent is used, the amino group of the diamine silane coupling agent reacts with the isocyanate group. As a result, an alcohol-soluble urethane resin (A) having a hydrolyzable silyl group not at the molecular terminus but in a molecular side chain can be obtained.

Examples of the monoamine silane coupling agent include γ-aminopropyltriethoxysilane, γ-aminopropyltrimethoxysilane, γ-aminopropylmethyldimethoxysilane, and γ-aminopropylmethyldiethoxysilane. These monoamine silane coupling agents may be used alone or in combination.

Examples of the diamine silane coupling agent include N-β(aminoethyl)γ-aminopropyltrimethoxysilane and N-β(aminoethyl)γ-aminopropylmethyldimethoxysilane. These diamine silane coupling agents may be used alone or in combination.

Examples of the isocyanate group-containing silane coupling agent include a monoisocyanate group-containing silane coupling agent and a diisocyanate group-containing silane coupling agent.

When the molecular terminus of the urethane prepolymer (a3) is a hydroxyl group and the monoisocyanate group-containing silane coupling agent is used, the isocyanate group of the monoisocyanate group-containing silane coupling agent reacts with the hydroxyl group. As a result, an alcohol-soluble urethane resin (A) having a hydrolyzable silyl group at a molecular terminus can be obtained.

When the molecular terminus of the urethane prepolymer (a3) is a hydroxyl group and the diisocyanate group-containing silane coupling agent is used, the isocyanate group of the diisocyanate group-containing silane coupling agent reacts with the hydroxyl group. As a result, an alcohol-soluble urethane resin (A) having a hydrolyzable silyl group not at a molecular terminus but in a molecular side chain can be obtained.

Examples of the monoisocyanate group-containing silane coupling agent include γ-isocyanatepropyltriethoxysilane and γ-isocyanatepropyltrimethoxysilane. These may be used alone or in combination.

From the viewpoint of obtaining a cured product having high heat resistance, preferably the monoamine silane coupling agent and more preferably γ-aminopropyltriethoxysilane or γ-isocyanatepropyltriethoxysilane is used as the coupling agent (a4).

The coupling agent (a4) is preferably used in a range that the ratio of the amino groups relative to 1.00 equivalent of the isocyanate groups of the urethane prepolymer (a3) is 0.01 to 1.0 (equivalent ratio) and more preferably 0.01 to 0.9 (equivalent ratio). When the functional group at the molecular terminus of the urethane prepolymer (a3) is a hydroxyl group, the coupling agent (a4) is preferably used so that the ratio of the isocyanate groups of the coupling agent (a4) to 1.00 equivalent of the hydroxyl groups is preferably in a range of 0.01 to 1.0 (equivalent ratio) and more preferably in a range of 0.01 to 0.9 (equivalent ratio).

The coupling agent (a4) is preferably used in a range that the ratio of the amino groups relative to 1.00 equivalent of the isocyanate groups of the urethane prepolymer (a3) is 0.01 to 1.0 (equivalent ratio) and more preferably 0.01 to 0.1 (equivalent ratio). When the coupling agent (a4) or preferably γ-aminopropyltriethoxysilane or γ-isocyanatepropyltriethoxysilane is used in such a range of equivalent ratio, a urethane resin composition that can form a cured product having higher heat resistance can be obtained.

If needed, a chain elongation agent (a5) can be used in synthesizing the alcohol-soluble urethane resin (A) in order to increase the molecular weight of the urethane resin (A) and improve the heat resistance of the cured product to be obtained.

A known diamine, alkanolamine, or the like can be used as the chain elongation agent (a5). In particular, a diamine is preferably used to maintain high storage stability of the urethane resin composition to be obtained.

Note that since the diamine silane coupling agent and the diisocyanate group-containing silane coupling agent used as the coupling agent (a4) can also be used as chain elongation agents, the chain elongation agent (a5) is not always necessary if they are used.

However, when the monoamine silane coupling agent or monoisocyanate group-containing silane coupling agent is used as the coupling agent (A4), the chain elongation agent (a5) is preferably used to increase the molecular weight of the alcohol-soluble urethane resin (A) and obtain a cured product having high heat resistance.

Examples of the diamine include dicyclohexylmethane diamine, isophorone diamine, 4,4'-diphenylmethane diamine, diaminoethane, 1,2- or 1,3-diaminopropane, 1,2- or 1,3- or 1,4-diaminobutane, 1,5-diaminopentane, 1,6-diaminohexane, piperazine, N,N'-bis-(2-aminoethyl)piperazine, bis-(4-aminocyclohexyl)methane, bis-(4-amino-3-butylcyclohexyl)methane, 1,2-, 1,3- and 1,4-diaminocyclohexane, norbornene diamine, hydrazine, and dihydrazine adipate. These may be used alone or in combination. Among these, an alicyclic structure-containing diamine or an aliphatic diamine is preferably used from the viewpoint of synthesizing an alcohol-soluble urethane resin (A) that has high solubility in the alcohol (C). More preferably, dicyclohexylmethane diamine or isophorone diamine is used.

In the present invention, chain elongation agents other than the diamines described above may be used in combination if needed. Examples thereof include ethylene glycol, 1,2-propanediol, 1,3-butanediol, 1,4-butanediol, 2,3-butanediol, 3-methyl-1,5-pentanediol, 1,6-hexanediol, 3,3'-dimethylolheptane, 1,4-cyclohexanedimethanol, neopentyl glycol, 3,3-bis(hydroxymethyl)heptane, diethylene glycol, dipropylene glycol, polyethylene glycol, polypropylene glycol, polybutylene glycol, glycerin, trimethylolpropane, sorbitol, and hydroquinonediethylol ether.

The diamine is preferably used in a range that the ratio of the amino groups relative to 1.00 equivalent of the isocyanate groups of the urethane prepolymer (a3) is 0.50 to 1.00 (equivalent ratio) and more preferably 0.60 to 0.90 in order to impart high heat resistance to the cured product to be obtained.

Next, inorganic particles (B) used in the present invention will be described.

The inorganic particles (B) used in the present invention does not easily react with the hydrolyzable silyl group of the urethane resin (A) in the presence of the alcohol (C). However, the inorganic particles have a functional group [Y] that can react and form a bond with the functional group [X] such as a silanol group formed by hydrolysis of the hydrolyzable silyl group of the alcohol-soluble urethane resin (A) with moisture (water) or the like in the air when the urethane resin composition of the present invention is applied on a substrate surface and dried to remove the alcohol (C).

Examples of the functional group [Y] of the inorganic particles (B) include those that can react with the functional group [X] such as a silanol group generated from the hydrolyzable silyl group, e.g., hydrophilic groups such as a hydroxyl group, a hydrolyzable silyl group, and a silanol group. Preferably two or more functional groups [Y] are present per square nanometer of the surface area of an inorganic particle. More preferably 3 to 20 and most preferably 3 to 10 functional groups [Y] are present in order to improve the heat resistance of the cured product to be obtained and dispersibility of the inorganic particles (B) in the urethane resin (A).

Examples of the inorganic particles (B) generally include metal oxides known as silica, alumina, titania, and zirconia, and hydrolytic condensates thereof. To be more specific, at least one metal oxide selected from the group consisting of silicon, zirconium, iron, silver, aluminum, titanium, zinc, indium, copper, germanium, tin, cerium, tungsten, and magnesium or a hydrolytic condensate thereof can be used.

In the present invention, although any of the inorganic particles (B) described above can be used, at least one metal oxide selected from the group consisting of silicon, aluminum, titanium, zirconium, zinc, and tin or a hydrolytic condensate thereof is preferably used from the viewpoint of imparting higher heat resistance and chemical resistance and high hardness. In particular, a silicon compound having a hydroxyl group or a silanol group, which is generally known as hydrophilic silica, or a hydrolytic condensate thereof is preferably used. The alkoxy group or hydroxyl group directly bonded to the silicon atom is preferably the same as the hydrolyzable silyl group of the alcohol-soluble urethane resin (A) and the silanol group formed by hydrolysis of the hydrolyzable silyl group.

Among the inorganic particles (B) that can be used in synthesis of the urethane resin composition of the present invention, the hydrophilic silica can be what is generally known as nanosilica having an average particle size on a micrometer or nanometer order and preferably on a nanometer order. Examples thereof include products of Nissan Chemical Industries, Ltd., such as methanol silica sol, MEK-ST, MIBK-ST, IPA-ST, IPA-ST-UP, IPA-ST-L, IPA-ST-ZL, NPC-ST-30, XBA-ST, EG-ST, and DMAC-ST (trade names) and products of Nippon Aerosil Co., Ltd., such as AEROSIL 90, AEROSIL 130, AEROSIL 150, AEROSIL 200, AEROSIL 300, AEROSIL 380, AEROSIL OX50, AEROSIL EG50, and AEROSIL TT600.

Examples of the inorganic particles which are an aluminum oxide or a hydrolytic condensate thereof among the inorganic particles (B) include ALUMINASOL-100, ALUMINASOL-200, and ALUMINASOL-520 (trade names) produced by Nissan Chemical Industries, Ltd. Examples of the inorganic particles which are a zirconium oxide or a hydrolytic condensate thereof include ZSL10T (trade name) produced by Daiichi Kigenso Kagaku Kogyo Co., Ltd.

Examples of the inorganic particles (B) in addition to those described above include powders of titanium oxide, indium oxide, tin oxide, and zinc oxide, and dispersions of such powders in solvents.

Inorganic particles having an average particle size of about 10 nm to 10000 nm (10 μm), more preferably 10 nm to 90 nm, and most preferably 10 nm to 80 nm are preferably used as the inorganic particles (B) to obtain a cured product having high heat resistance and flexibility (elongation). In order to further improve the flexibility (elongation) of a cured product to be obtained, inorganic particles having an average particle size of preferably about 40 nm to 90 nm and more preferably about 50 nm to 90 nm are preferably used. Mixing of the inorganic particles (B) and the urethane resin (A) is preferably conducted by using a stirrer such as a homomixer, if necessary, so that the inorganic particles are homogeneously dispersed in the urethane resin composition. Note that the average particle size of the inorganic particles (B) in the present invention refers to a value measured by a dynamic scattering method.

The shape of the inorganic particles (B) is spherical, hollow, porous, rod-like, plate-like, fibrous, or irregular, and preferably spherical or hollow. The BET specific surface area (BET specific area measurement method that uses nitrogen) of the inorganic particles (B) is preferably 10 to 1000 m$^2$/g and more preferably 50 to 100 m$^2$/g.

A powder may be used as the inorganic particles (B); however, in synthesizing the urethane resin composition of the present invention, the inorganic particles (B) are preferably dispersed in a solvent such as ethanol or isopropyl alcohol in advance from the viewpoint of ease of mixing with the alcohol-soluble urethane resin (A) and an alcohol (C) solution thereof.

The surfaces of the inorganic particles (B) may be modified with an alcohol such as methanol, ethanol, isopropanol, butanol, or octanol; a ketone such as acetone, methyl ethyl ketone, methyl isobutyl ketone, or cyclohexanone; an ester such as ethyl acetate, butyl acetate, ethyl lactate, γ-butyrolactone, propylene glycol monomethyl ether acetate, or propylene glycol monoethyl ether acetate; an ether such as ethylene glycol monomethyl ether or diethylene glycol monobutyl ether; an aromatic hydrocarbon such as benzene, toluene, or xylene; or an amide such as dimethylformamide, dimethylacetamide, or N-methyl pyrrolidone.

Next, the alcohol (C) used in the present invention will be described.

The alcohol (C) is used as a solvent for the alcohol-soluble urethane resin (A) and the inorganic particles (B).

The alcohol (C) may have any structure such as a linear structure, a branched structure, or a ring structure; however, from the viewpoint of increasing the solubility of the urethane resin (A), an alcohol having preferably 1 to 7 and more preferably 1 to 4 carbon atoms, such as methyl alcohol, ethyl alcohol, n-propyl alcohol, isopropyl alcohol, n-butyl alcohol, isobutyl alcohol, or t-butyl alcohol is preferably used. More preferably, methyl alcohol, ethyl alcohol, n-propyl alcohol, and isopropyl alcohol are used alone or in combination.

Unlike strong solvents such as dimethylformamide (DMF), the alcohol (C) is classified as a mild solvent and does not cause dissolution or deterioration of the surface of a workpiece onto which the urethane resin composition of the present invention is applied. In particular, when the workpiece is porous, the pores constituting the porous workpiece remain intact and thus the flexibility inherent in the porous workpiece is not impaired.

In the presence of excess alcohol (C), hydrolytic condensation reaction between the hydrolyzable silyl group and/or silanol group of the alcohol-soluble urethane resin (A) and the hydroxyl group, preferably a silanol group or hydrolyzable silyl group, of the inorganic particles (B) does not substantially proceed. Accordingly, it is important for the urethane resin composition of the present invention to use the alcohol (C) as a solvent.

The urethane resin composition may contain a solvent other than the alcohol (C). For example, the composition may contain a strong solvent such as dimethylformamide or toluene, but the content thereof is preferably as low as possible from the viewpoint of reducing the environmental impact. In particular, the mass ratio of the alcohol (C) to the total mass of the solvents contained in the urethane resin composition of the present invention is preferably 95% to 100% by mass, more preferably 98% to 100% by mass, and most preferably 100% by mass.

The urethane resin composition of the present invention can be synthesized by mixing the alcohol (C) solution of the alcohol-soluble urethane resin (A) obtained by the above-described method and the inorganic particles (B) in batch or by sequential feeding such as adding one to the other dropwise, and stirring the resulting mixture. The inorganic particles (B) preliminarily dispersed in a solvent such as ethanol or isopropyl alcohol are preferably used as the inorganic particles (B) in order to have the inorganic particles (B) relatively homogeneously dispersed and to improve the synthetic efficiency of the urethane resin composition of the present invention.

Mixing of the alcohol (C) solution of the urethane resin (A) and the inorganic particles (B) can be conducted under a temperature condition of about 10° C. to 50° C. by using a stirring rod or the like or with a stirring device such as a homomixer. In order to have the inorganic particles (B) homogeneously dispersed, the mixing method is preferably a method that uses a stirring device such as a homomixer.

If needed, for example, a cross-linking agent, a catalyst, a film-forming aid, a filler, a thixotropy imparting agent, a tackifier, a surfactant, a pigment, a resin for blend, and other additives may be added to the urethane resin composition of the present invention as long as the object of the represent invention is not impaired.

Examples of the cross-linking agent include isocyanate-based cross-linking agents such as tolylene diisocyanate, naphthylene-1,5-diisocyanate, hexamethylene diisocyanate, diphenylmethane diisocyanate, and trimethylolpropane-modified tolylene diisocyanate.

An acid catalyst such as maleic anhydride or phosphoric acid can be used as the catalyst from the viewpoint of allowing the hydrolytic condensation reaction between the hydrolyzable silyl group or silanol group of the urethane resin (A) and the hydroxyl group and the like of the inorganic particles (B) to proceed.

The film-forming aid is not particularly limited and examples thereof include anionic surfactants (such as dioctyl sulfosuccinic acid ester sodium salt), hydrophobic nonionic surfactants (such as sorbitan monooleate), and silicone oil.

Examples of the filler include carbonates (e.g., calcium carbonate, calcium/magnesium carbonate, and magnesium carbonate), silicic acid, silicates (e.g., aluminum silicate, magnesium silicate, and calcium silicate), hydroxides (e.g., aluminum hydroxide, magnesium hydroxide, and calcium hydroxide), sulfates (e.g., barium sulfate, calcium sulfate, and magnesium sulfate), borates (e.g., aluminum borate, zinc borate, and calcium borate), titanates (such as potassium titanate), metal oxides (e.g., zinc, titanium, magnesium, calcium, and aluminum), carbon materials, and organic materials other than the inorganic particles (B).

Examples of the thixotropy imparting agent include the fillers surface-treated with fatty acids, fatty acid metal salts, fatty acid esters, paraffins, resin acids, surfactants, polyacrylic acids, etc., polyvinyl chloride powder, hydrogenated castor oil, fine particle silica, organic bentonite, and sepiolite.

The tackifier is not particularly limited. Examples thereof include rosin resin-based, terpene resin-based, and phenol resin-based tackifiers.

Examples of other additives include a reaction accelerator (metal based, metal salt based, amine based, etc.), a stabilizer (ultraviolet light absorber, antioxidant, heat-resistant stabilizer, etc.), a water-removing agent (4-paratoluene sulfonylisocyanate etc.), an adsorber (burnt lime, hydrated lime, zeolite, molecular sieve, etc.), an adhesiveness imparting agent (coupling agent, organic metal-based coupling agent, etc.), a defoaming agent, and a leveling agent.

The urethane resin composition of the present invention rarely induced gelation or the like, has good dispersion stability, and, when cured, can give a cured product having excellent heat resistance. Moreover, since an alcohol is used as the solvent, dissolution, deterioration, etc., of the substrate surface do not occur.

Accordingly, the urethane resin composition of the present invention can be used as a coating material for use in a surface coating of a part required to have heat resistance and as an adhesive therefor. In particular, the urethane resin composition of the present invention is more preferably used as a coating material for forming a top layer or a coating material for forming a primer layer.

Examples of the substrate onto which the coating material or the adhesive can be applied to form a coating or conduct bonding include metal substrates; plastic substrates, glass substrates, paper and wood substrates, and fiber substrates. Porous substrates such as urethane foams and the like can also be used.

Examples of the metal substrates include plated steel sheets such as galvanized steel sheets and aluminum-zinc alloy steel sheets, aluminum sheets, aluminum alloy sheets, electrical steel sheets, copper sheets, and stainless steel sheets.

Examples of the plastic substrates include polycarbonate substrates, polyester substrates, acrylonitrile-butadiene-styrene substrates, polyacryl substrates, polystyrene substrates, polyurethane substrates, epoxy resin substrates, polyvinyl chloride substrates, and polyamide substrates.

Examples of the method of applying the coating material or the adhesive onto the substrate include a spray method, a curtain coater method, a flow coater method, a roll coater method, a brush coating method, and a dipping method.

Moreover, the urethane resin composition of the present invention can be used in manufacturing cured products required to have a very high level of heat resistance, such as automobile parts, home electric appliance parts, and electronic materials.

Moreover, since the urethane resin composition of the present invention can achieve high heat resistance and good elongation (flexibility) by optimizing the average particle size and the amount of use of the inorganic particles (B), it can be used as a coating material and an adhesive, and in manufacture of various parts in the fields of automobile parts, electronic materials, etc., that are repeatedly used in environment with significant fluctuations in temperature.

An example of the method for curing the urethane resin composition of the present invention to form a coating or a cured product is a method that includes a step of applying the urethane resin composition onto a substrate surface through the above-described method and drying the applied composition to remove the alcohol (C) in the applied layer and a step of conducting hydrolytic condensation reaction between the urethane resin (A) and the inorganic particles (B).

The step of removing the alcohol (C) is preferably conducted by leaving the applied composition to stand at room temperature or under a condition of about 30° C. to 80° C.

The step of conducting hydrolytic condensation reaction between the functional group [X] such as a silanol group formed by hydrolysis of the hydrolyzable silyl group of the urethane resin (A) and the functional group [Y] of the inorganic particles (B) can be accelerated by heating at about 80° C. to 150° C. When the hydrolytic condensation reaction does not proceed smoothly by heating alone, the acid catalyst may be used or water may be added as needed to accelerate the hydrolytic condensation reaction. In particular, when the (Method 2) or (Method 4) is employed and the urethane resin (A) is synthesized by using a polycarbonate polyol or a polyester polyol, the mass ratio of the hydrolyzable silyl group and silanol group of the urethane resin (A) is increased; thus, water is preferably added in curing the urethane resin composition of the present invention to accelerate the hydrolytic condensation reaction.

The water is preferably used in an amount of 0.1% to 10% by mass relative to the total mass of the urethane resin (A) and the inorganic particles (B).

The cured product such as a coating obtained by this method does not undergo deformation or mass loss even in an environment of about 200° C. or more and exhibits significantly high heat resistance.

As described above, the coating material or adhesive containing the urethane resin composition of the present invention can be used in various usages such as manufacture of cellular phones, home electric appliances, office automation equipment, automobile parts such as automobile internal and external equipment, parts of home electric appliances, electronic materials, construction products, and medical materials such as artificial bones and teeth, surface coatings therefor, and bonding.

EXAMPLES

The present invention will now be described in specific detail through examples.

Example 1

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-1).

In a second step, 558 g of the urethane prepolymer (a3-1) was added under stirring to a mixture obtained by preliminarily mixing 85 g of dicyclohexylmethanediamine, 5.4 g of γ-aminopropyltriethoxysilane, and 1300 g of isopropyl alcohol in a 25° C. environment, and reaction was conducted for 3 hours at about 30° C. to 40° C. to obtain a resin solution (I-1) containing a urethane resin (A-1) (number-average molecular weight: 20,000) having a hydrolyzable silyl group dissolved in isopropyl alcohol.

The resin solution (I-1) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 30% by mass) were mixed so that the mass ratio of the urethane resin (A-1) to the nonvolatile component content of the hydroxyl group-containing silica, i.e., [urethane resin (A-1)/hydroxyl group-containing silica], was 100/100, followed by stirring to obtain a urethane resin composition (I) of the present invention.

Example 2

In a first step, 76 g of isophorone diisocyanate and 174 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-2).

In a second step, 250 g of the urethane prepolymer (a3-2) was added under stirring to a mixture obtained by preliminarily mixing 18 g of dicyclohexylmethanediamine, 7.6 g of γ-aminopropyltriethoxysilane, and 228 g of isopropyl alcohol in a 25° C. environment, and reaction was conducted for 3 hours at about 30° C. to 40° C. to obtain a resin solution (I-2)

containing a urethane resin (A-2) (number-average molecular weight: 20,000) having a hydrolyzable silyl group dissolved in isopropyl alcohol.

The resin solution (I-2) and nanosilica (trade name: "IPA-ST-ZL" produced by Nissan Chemical Industries, Ltd., a mixture of a hydroxyl group-containing silica having an average particle size of 85 nm and isopropyl alcohol, nonvolatile component content: 30% by mass) were mixed so that the mass ratio of the urethane resin (A-2) to the nonvolatile component content of the hydroxyl group-containing silica, i.e., [urethane resin (A-2)/hydroxyl group-containing silica], was 100/100, followed by stirring to obtain a urethane resin composition (II) of the present invention.

Example 3

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-3).

In a second step, 558 g of the urethane prepolymer (a3-3) was added under stirring to a mixture obtained by preliminarily mixing 85 g of dicyclohexylmethanediamine, 5.4 g of γ-aminopropyltriethoxysilane, and 1300 g of isopropyl alcohol in a 25° C. environment, and reaction was conducted for 3 hours at about 30° C. to 40° C. to obtain a resin solution (I-3) containing a urethane resin (A-3) (number-average molecular weight: 20,000) having a hydrolyzable silyl group dissolved in isopropyl alcohol.

The resin solution (I-3) and nanosilica (trade name: "IPA-ST-UP" produced by Nissan Chemical Industries, Ltd., a mixture of a hydroxyl group-containing silica having an average particle size of 12 nm and isopropyl alcohol, nonvolatile component content: 15% by mass) were mixed so that the mass ratio of the urethane resin (A-3) to the nonvolatile component content of the hydroxyl group-containing silica, i.e., [urethane resin (A-3)/hydroxyl group-containing silica], was 100/100, followed by stirring to obtain a urethane resin composition (III) of the present invention.

Example 4

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-4).

In a second step, 558 g of the urethane prepolymer (a3-4) was added under stirring to a mixture obtained by preliminarily mixing 85 g of dicyclohexylmethanediamine, 5.4 g of γ-aminopropyltriethoxysilane, and 1300 g of isopropyl alcohol in a 25° C. environment, and reaction was conducted for 3 hours at about 30° C. to 40° C. to obtain a resin solution (I-4) containing a urethane resin (A-4) (number-average molecular weight: 20,000) having a hydrolyzable silyl group dissolved in isopropyl alcohol.

The resin solution (I-4) and nanosilica (trade name: "IPA-ST" produced by Nissan Chemical Industries, Ltd., a mixture of a hydroxyl group-containing silica having an average particle size of 13 nm and isopropyl alcohol, nonvolatile component content: 30% by mass) were mixed so that the mass ratio of the urethane resin (A-4) to the nonvolatile component content of the hydroxyl group-containing silica, i.e., [urethane resin (A-4)/hydroxyl group-containing silica], was 100/100, followed by stirring to obtain a urethane resin composition (IV) of the present invention.

Example 5

In a first step, 166 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-5) having an isocyanate group at a molecular terminus.

The urethane prepolymer (a3-5), 56 g of dicyclohexylmethanediamine, and 6 g of γ-aminopropyltriethoxysilane were mixed and the reaction was conducted in the absence of a solvent in a nitrogen stream at 90° C. for 6 hours to obtain a urethane resin (a-5) having a hydrolyzable silyl group and/or a silanol group.

Then the urethane resin (a-5) and 353 g of isopropyl alcohol were mixed in a 25° C. environment to obtain a resin solution (I-5) containing a urethane resin (A-5) (number-average molecular weight: 2000) having a hydrolyzable silyl group dissolved in isopropyl alcohol.

The resin solution (I-5) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 30% by mass) were mixed so that the mass ratio of the urethane resin (A-5) to the nonvolatile component content of the hydroxyl group-containing silica, i.e., [urethane resin (A-5)/hydroxyl group-containing silica], was 100/100, followed by stirring to obtain a urethane resin composition (V) of the present invention.

Example 6

In a first step, 166 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-6) having an isocyanate group at a molecular terminus.

The urethane prepolymer (a3-6), 56 g of dicyclohexylmethanediamine, and 6 g of γ-aminopropyltriethoxysilane were mixed and the reaction was conducted in the absence of a solvent in a nitrogen stream at 90° C. for 6 hours to obtain a urethane resin (a-6) having a hydrolyzable silyl group and/or a silanol group.

Then the urethane resin (a-6) and 353 g of isopropyl alcohol were mixed in a 25° C. environment to obtain a resin solution (I-6) containing a urethane resin (A-6) (number-average molecular weight: 2000) having a hydrolyzable silyl group dissolved in isopropyl alcohol.

The resin solution (I-6) and nanosilica (trade name: "IPA-ST" produced by Nissan Chemical Industries, Ltd., a mixture of a hydroxyl group-containing silica having an average particle size of 13 nm and isopropyl alcohol, nonvolatile component content: 15% by mass) were mixed so that the mass ratio of the urethane resin (A-6) to the nonvolatile component content of the hydroxyl group-containing silica, i.e., [urethane resin (A-6)/hydroxyl group-containing silica], was 100/100, followed by stirring to obtain a urethane resin composition (VI) of the present invention.

Example 7

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-7).

In a second step, 85 g of dicyclohexylmethanediamine and 5.4 g of γ-aminopropyltriethoxysilane were added to a mixture preliminarily prepared by mixing the urethane prepolymer (a3-7) and 1300 g of isopropyl alcohol in a 25° C. environment, and the reaction was conducted in a 25° C. environment to prepare a resin solution (I-7) containing a urethane resin (A-7) (number-average molecular weight: 20,000) having a hydrolyzable silyl group and/or a silanol group dissolved in isopropyl alcohol.

The resin solution (I-7) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 30% by mass) were mixed so that the mass ratio of the urethane resin (A-7) to the nonvolatile component content of the hydroxyl group-containing silica, i.e., [urethane resin (A-7)/hydroxyl group-containing silica], was 100/100, followed by stirring to obtain a urethane resin composition (VII) of the present invention.

Example 8

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-8).

In a second step, 85 g of dicyclohexylmethanediamine and 5.4 g of γ-aminopropyltriethoxysilane were added to a mixture preliminarily prepared by mixing the urethane prepolymer (a3-8) and 1300 g of isopropyl alcohol in a 25° C. environment, and the reaction was conducted in a 25° C. environment to prepare a resin solution (I-8) containing a urethane resin (A-8) (number-average molecular weight: 20,000) having a hydrolyzable silyl group dissolved in isopropyl alcohol.

The resin solution (I-8) and nanosilica (trade name: "IPA-ST" produced by Nissan Chemical Industries, Ltd., a mixture of a hydroxyl group-containing silica having an average particle size of 13 nm and isopropyl alcohol, nonvolatile component content: 30% by mass) were mixed so that the mass ratio of the urethane resin (A-8) to the nonvolatile component content of the hydroxyl group-containing silica, i.e., [urethane resin (A-8)/hydroxyl group-containing silica], was 100/100, followed by stirring to obtain a urethane resin composition (VIII) of the present invention.

Example 9

In a first step, 66 g of isophorone diisocyanate and 600 g of T-5651 (polycarbonatediol produced by Asahi Kasei Chemicals Corporation, molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-9) having a hydroxyl group at a molecular terminus.

The urethane prepolymer (a3-9) and 138 g of γ-monoisocyanatepropyltriethoxysilane were mixed at 90° C. and the reaction was conducted in the absence of a solvent in a nitrogen stream at 90° C. for 6 hours to obtain a urethane resin (a-9) (number-average molecular weight: 2000) having a hydrolyzable silyl group and/or a silanol group.

Then the urethane resin (a-9) and 89 g of isopropyl alcohol were mixed at 80° C. or less to obtain a resin solution (I-9) containing a urethane resin (A-9) having a hydrolyzable silyl group dissolved in isopropyl alcohol.

The resin solution (I-9) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 30% by mass) were mixed so that the mass ratio of the urethane resin (A-9) to the nonvolatile component content of the hydroxyl group-containing silica, i.e., [urethane resin (A-9)/hydroxyl group-containing silica], was 100/100 and 0.5 g of a Catalyst ML (acid catalyst produced by DIC Corporation) and 1 g of water were added thereto, followed by stirring, to obtain a urethane resin composition (IX) of the present invention.

Example 10

In a first step, 66 g of isophorone diisocyanate and 600 g of a polyesterdiol (molecular weight: 1000) obtained by reacting 3-methylpentanediol and adipic acid were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-10) having a hydroxyl group at a molecular terminus.

The urethane prepolymer (a3-10) and 138 g of γ-monoisocyanatepropyltriethoxysilane were mixed and the reaction was conducted in the absence of a solvent in a nitrogen stream at 90° C. for 6 hours to obtain a urethane resin (a-10) having a hydrolyzable silyl group and/or a silanol group.

Then the urethane resin (a-10) and 89 g of isopropyl alcohol were mixed in a 25° C. environment to obtain a resin solution (I-10) containing a urethane resin (A-10) (number-average molecular weight: 2000) having a hydrolyzable silyl group dissolved in isopropyl alcohol.

The resin solution (I-10) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 30% by mass) were mixed so that the mass ratio of the urethane resin (A-10) to the nonvolatile component content of the hydroxyl group-containing silica, i.e., [urethane resin (A-10)/hydroxyl group-containing silica], was 100/100 and 0.5 g of a Catalyst ML (acid catalyst produced by DIC Corporation) and 1 g of water were added thereto, followed by stirring, to obtain a urethane resin composition (X) of the present invention.

Example 11

In a first step, 78 g of 2,4-tolylene diisocyanate and 500 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-11) having a hydroxyl group in a molecular.

The urethane prepolymer (a3-11) and 0.85 g of γ-isocyanatepropyltriethoxysilane were mixed and the reaction was conducted in the absence of a solvent in a nitrogen stream at 90° C. for 6 hours to obtain a urethane resin (a-11) having a hydrolyzable silyl group and/or a silanol group.

Then the urethane resin (a-11) and 559 g of isopropyl alcohol were mixed in a 25° C. environment to obtain a resin solution (I-11) containing a urethane resin (A-11) (number-average molecular weight: 2000) dissolved in isopropyl alcohol.

The resin solution (I-11) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 30% by mass) were mixed so that the mass ratio of the urethane resin (A-11) having a hydrolyzable silyl group to the nonvolatile component content of the hydroxyl group-containing silica, i.e., [urethane resin (A-11)/hydroxyl group-containing silica], was 100/300, and 1 g was water was added thereto, followed by stirring to obtain a urethane resin composition (XI) of the present invention.

Example 12

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3-12).

In a second step, 558 g of the urethane prepolymer (a3-1) was added under stirring to a mixture obtained by preliminarily mixing 85 g of dicyclohexylmethanediamine, 5.4 g of γ-aminopropyltriethoxysilane, and 1300 g of isopropyl alcohol in a 25° C. environment, and reaction was conducted for 3 hours at about 30° C. to 40° C. to obtain a resin solution (I-12) containing a urethane resin (A-12) (number-average molecular weight: 20,000) having a hydrolyzable silyl group dissolved in isopropyl alcohol.

The resin solution (I-12) and fine particle titanium oxide (trade name: "TTO-W-5" produced by Ishihara Sangyo Kaisha, Ltd., an aqueous sol of a hydroxyl group-containing fine particles of titanium oxide having an average particle size of 15 nm, nonvolatile component content: 30% by mass) were mixed so that the mass ratio of the urethane resin (A-12) to the nonvolatile component content of the hydroxyl group-containing fine particles of titanium oxide, i.e., [urethane resin (A-12)/titanium oxide], was 100/100, followed by stirring to obtain a urethane resin composition (XII) of the present invention.

Comparative Example 1

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3'-1).

In a second step, 558 g of the urethane prepolymer (a3'-1) was added under stirring to a mixture obtained by preliminarily mixing 85 g of dicyclohexylmethanediamine, 5.4 g of γ-aminopropyltriethoxysilane, and 1300 g of isopropyl alcohol in a 25° C. environment, and reaction was conducted for 3 hours at 25° C. to obtain a resin solution (I'-1) containing a urethane resin (A'-1) (number-average molecular weight: 20,000) having a hydrolyzable silyl group dissolved in isopropyl alcohol.

The resin solution (I'-1) and hydrophobic silica (trade name: "R972", produced by Degussa Kabushiki Kaisha, a mixture of silica having an average particle size of 16 nm with no functional group [Y] and isopropyl alcohol) were mixed so that the mass ratio of the urethane resin (A'-1) to the silica with no functional group [Y], i.e., [urethane resin (A'-1)/silica with no functional group [Y], was 100/100, followed by stirring to obtain a urethane resin composition (I') of the present invention.

Comparative Example 2

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3'-2).

In a second step, 558 g of the urethane prepolymer (a3'-2) was added under stirring to a mixture obtained by preliminarily mixing 85 g of dicyclohexylmethanediamine and 1300 g of isopropyl alcohol in a 25° C. environment, and reaction was conducted for 3 hours at about 30° C. to 40° C. to obtain a resin solution (I'-2) containing a urethane resin (A'-2) (number-average molecular weight: 20,000) dissolved in isopropyl alcohol.

The resin solution (I'-2) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 45% by mass) were mixed so that the mass ratio of the urethane resin (A'-2) to the nonvolatile component content of the hydroxyl group-containing silica, i.e., [urethane resin (A'-2)/hydroxyl group-containing silica], was 100/100, followed by stirring to obtain a urethane resin composition (II') of the present invention.

Comparative Example 3

In a first step, 167 g of isophorone diisocyanate and 300 g of polytetramethylene glycol (molecular weight: 1000) were charged in a reactor equipped with a stirrer, a thermometer, and a nitrogen gas introduction tube, and reaction was conducted for 6 hours in the absence of a solvent under stirring in a nitrogen stream at 90° C. to synthesize a urethane prepolymer (a3'-3).

In a second step, 558 g of the urethane prepolymer (a3'-3) was added under stirring to a mixture obtained by preliminarily mixing 85 g of dicyclohexylmethanediamine, 5.4 g of γ-aminopropyltriethoxysilane, and 1300 g of dimethylformamide (DMF) in a 25° C. environment, and reaction was conducted for 3 hours at about 30° C. to 40° C. to obtain a resin solution a urethane resin (A'-3) having a hydrolyzable silyl and/or a silanol group.

Then the urethane resin (A'-3) and dimethylformamide were mixed in a 25° C. environment to obtain a resin solution (I'-3) containing the urethane resin ((A'-3) (number-average molecular weight: 20000) dissolved in dimethylformamide.

The resin solution (I'-3) and nanosilica (trade name: "IPA-ST-L" produced by Nissan Chemical Industries, Ltd., a mixture of a hydroxyl group-containing silica having an average particle size of 45 nm and isopropyl alcohol, nonvolatile component content: 45% by mass) were mixed so that the mass ratio of the urethane resin (A'-3) to the nonvolatile component content of the hydroxyl group-containing silica, i.e., [urethane resin (A'-3)/hydroxyl group-containing silica], was 100/100, followed by stirring to obtain a urethane resin composition (III') of the present invention.

[Method for Measuring Number-Average Molecular Weight of Urethane Resin]

The number-average molecular weight of a polyurethane resin was measured with a gel permeation chromatograph (GPC) with polystyrene standards under the following conditions:

Resin sample solution: a 0.4% dimethylformamide (DMF) solution

Column: KD-806M (produced by Showa Denko K.K.)

Eluant: DMF

[Evaluation Method for Storage Stability]

The viscosity of each of the urethane resin compositions obtained in Examples and Comparative Examples immediately after synthesis (initial viscosity) was measured with a digital viscometer TV-10 (produced by TOKISANGYO, measurement temperature: 25° C., rotational speed: 12 rpm, rotor: Lot No. 4).

Next, the urethane resin composition was placed in a glass jar, the glass jar was immersed in a constant-temperature water bath set to a temperature of 25° C. for 2 hours, and the viscosity of the composition was measured by the same method as described above.

The ratio of the viscosity after 2 hours of immersion to the initial viscosity, [viscosity after 2 hours of immersion/initial viscosity], was determined and samples with a ratio less than 1.2 were rated AA, a ratio of 1.2 or more and less than 1.5 were rated A, a ratio of 1.5 or more and less than 2.0 were rated B, and a ratio of 2.0 or more were rated C. Those samples which were rated C for the storage stability and thus could not be rated for "heat resistance", "transparency", and "flexibility" below were indicated by "—" in Tables 1 to 3.

[Evaluation Method for Heat Resistance]

The heat resistance of a cured product obtained by curing the urethane resin composition of the present invention was evaluated on the basis of "incipient fluidization temperature", "dimensional stability after heat resistance test", and "mass loss temperature (40% by mass)".

<Method for Producing a Test Film (Cured Product)>

Each of the urethane resin compositions obtained in Examples and Comparative Examples was applied on a releasing paper sheet so that the thickness of the dried film was 30 μm, and dried at 60° C. for 2 minutes to evaporate isopropyl alcohol and dimethylformamide.

Then heating at 120° C. was conducted for 2 minutes to accelerate the reaction between the hydrolyzable silyl group or silanol group of the urethane resin and the silanol group, hydrolyzable silyl group, or hydroxyl group of the inorganic particles and conduct curing, and the releasing paper sheet was removed to prepare a test film.

<Method for Measuring Incipient Fluidization Temperature>

The incipient fluidization temperature of the test film was measured with a Shimadzu Flow Tester CFT 500D-1 (produced by Shimadzu Corporation, heating method, measurement start temperature: 80° C., die: 1 mm×1 mm L, load: 98 N, holding time: 600 sec). Samples with an incipient fluidization temperature of 260° C. or more were rated as having high heat resistance.

[Evaluation Method for Dimensional Stability after Heat Resistance Test]

The dimensional stability was conducted by cutting the test film into 14 cm in length and 1 cm in width.

In particular, an upper end of the cut test film in the longitudinal direction was fixed in a drier (produced by Satake Corporation), and a weight of 5 g was fixed to a lower end of the test film.

The temperature of the drier was adjusted to 120° C., the test film was heated, and the heating time taken for the test film to rupture was measured.

Samples that took 400 hours until rupture were rated AA, 200 hours or more and less than 400 hours were rated A, 100 hours or more and less than 200 hours were rated B, and less than 100 hours were rated C.

[Method for Measuring the Mass Loss Temperature (40% by Mass) of Test Film (Cured Product)]

A thermogravimetry/differential thermal analyzer (TG-DTA 6200 produced by SII NanoTechnology Inc., temperature range: 30° C. to 550° C., heating rate: 10° C./min) was used to heat the test film.

The temperature at which 40% of the mass of the test film before heating was lost was determined, and a test film was evaluated as having high heat resistance when this temperature was high.

[Method for Evaluating Transparency (Method for Measuring Haze Value)]

The diffuse transmittance and the total transmittance of each test film were measured with NDH-300A (produced by Nippon Denshoku Industries Co., Ltd.), and the haze value of the test film was calculated by using the equation below.

Haze value(turbidity,%)=($DF$(diffusion transmittance)×100)/($TL$(total transmittance))

[Method for Evaluating Flexibility (Method for Measuring Elongation)]

The elongation of the test film was measured with Shimadzu Autograph AG-1 (produced by Shimadzu Corporation, test speed: 300 mm/min, gauge length: 20 mm, free length: 40 mm).

TABLE 1

|  | Example 1 | Example 2 | Example 3 | Example 4 | Example 5 | Example 6 |
|---|---|---|---|---|---|---|
| Storage stability | AA | AA | AA | AA | A | A |
| Incipient fluidization temperature (° C.) | >350 | 300 | >350 | >350 | >350 | >350 |
| Dimensional stability | AA | AA | AA | AA | AA | AA |
| 40 mass % loss temperature (° C.) | 485 | 410 | 485 | 485 | 400 | 400 |
| Haze value (%) | 10 | 7 | 11 | 12 | 12 | 12 |
| Elongation (%) | 77 | 390 | 70 | 80 | 30 | 30 |

TABLE 2

|  | Example 7 | Example 8 | Example 9 | Example 10 | Example 11 | Example 12 |
|---|---|---|---|---|---|---|
| Storage stability | A | AA | AA | A | A | A |

TABLE 2-continued

|   | Example 7 | Example 8 | Example 9 | Example 10 | Example 11 | Example 12 |
|---|---|---|---|---|---|---|
| Incipient fluidization temperature (° C.) | >350 | >350 | >350 | >350 | >350 | >350 |
| Dimensional stability | AA | AA | AA | AA | AA | A |
| 40 mass % loss temperature (° C.) | 485 | 485 | 510 | 500 | 490 | 400 |
| Haze value (%) | 16 | 16 | 12 | 12 | 12 | 10 |
| Elongation (%) | 30 | 30 | 70 | 30 | 30 | 70 |

TABLE 3

|   | Comparative Example 1 | Comparative Example 2 | Comparative Example 3 |
|---|---|---|---|
| Storage stability | C | AA | C |
| Incipient fluidization temperature (° C.) | — | 255 | — |
| Dimensional stability | — | A | — |
| 40 mass % loss temperature (° C.) | — | 350 | — |
| Haze value (%) | — | 16 | — |
| Elongation (%) | — | 324 | — |

The invention claimed is:

1. A urethane resin composition comprising: an alcohol-soluble urethane resin (A) having a hydrolyzable silyl group, inorganic particles (B), and an alcohol (C), wherein the inorganic particles (B) have a functional group [Y] that reacts with a functional group [X] generated from the hydrolyzable silyl group of the urethane resin (A), the functional group [X] is a silanol group formed by hydrolysis of the hydrolyzable silyl group, and the functional group [Y] is a hydroxyl group.

2. The urethane resin composition according to claim 1, wherein the alcohol-soluble urethane resin (A) has a number-average molecular weight in the range of 1000 to 300000.

3. The urethane resin composition according to claim 1, wherein the inorganic particles (B) contain at least one oxide of metals selected from the group consisting of silicon, zirconium, iron, aluminum, titanium, zinc, indium, copper, germanium, tin, cerium, tungsten, and magnesium or a hydrolytic condensate thereof.

4. The urethane resin composition according to claim 1, wherein the inorganic particles (B) have an average particle size of 10 nm to 10 μm.

5. The urethane resin composition according to claim 1, wherein the alcohol (C) is an alcohol having an alkyl group having 1 to 7 carbon atoms.

6. The urethane resin composition according to claim 1, wherein the mass ratio of the inorganic particles (B) to 100 parts by mass of the alcohol-soluble urethane resin (A) is in the range of 10 to 400 parts by mass.

7. The urethane resin composition according to claim 1, wherein the alcohol-soluble urethane resin (A) is obtained by reacting a polyisocyanate (a1) with a polyol (a2) containing at least one selected from the group consisting of a polyether polyol, a polyester polyol, and a polycarbonate polyol to give a urethane prepolymer (a3) having an isocyanate group or a hydroxyl group at a molecular terminus, and then reacting the urethane prepolymer (a3) with a coupling agent (a4) containing at least one selected from the group consisting of an amino group-containing silane coupling agent and an isocyanate group-containing silane coupling agent, and, if needed, a chain elongation agent (a5).

8. The urethane resin composition according to claim 7, wherein the polyisocyanate (a1) is an aliphatic or alicyclic structure-containing polyisocyanate.

9. The urethane resin composition according to claim 7, wherein the silane coupling agent (a4) is at least one selected from the group consisting of γ-aminopropyltriethoxysilane and γ-aminopropyltrimethoxysilane.

10. A coating material comprising the urethane resin composition according to any one of claims 1 to 9.

11. An adhesive comprising the urethane resin composition according to any one of claims 1 to 9.

12. A cured product obtained by curing the urethane resin composition according to any one of claims 1 to 9.

13. The cured product according to claim 12, wherein a silanol group which is the functional group [X] generated from the hydrolyzable silyl group of the alcohol-soluble urethane resin (A) reacts with a hydroxyl group which is the functional group [Y] of the inorganic particles (B) to form a bond.

14. A method for producing a cured product, comprising applying a composition obtained by mixing the urethane resin composition according to any one of claims 1 to 9 with water or an acid catalyst if necessary onto a substrate surface, and removing the alcohol (C) in the applied layer so that the functional group [X] formed by hydrolysis of the hydrolyzable silyl group of the alcohol-soluble urethane resin (A) reacts with the functional group [Y] of the inorganic particles (B) to form a bond, wherein the functional group [X] is a silanol group and the functional group [Y] is a hydroxyl group.

* * * * *